E. W. MIGHELL.
VEHICLE TIRE.
APPLICATION FILED MAR. 11, 1916.
1,234,682.
Patented July 24, 1917.
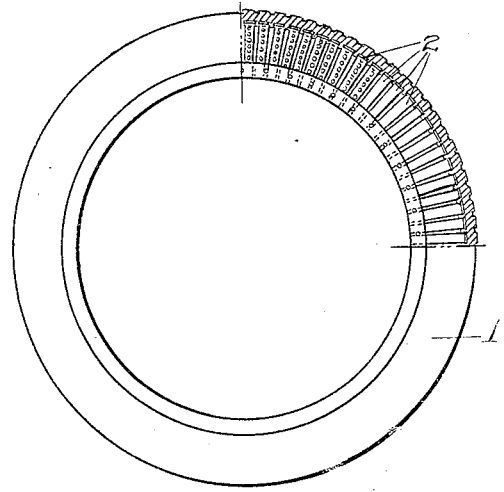
Fig.1
Fig.2
Fig.3
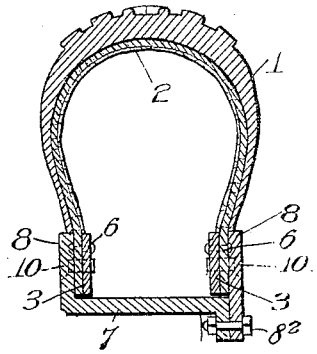
Fig.4
Fig.5
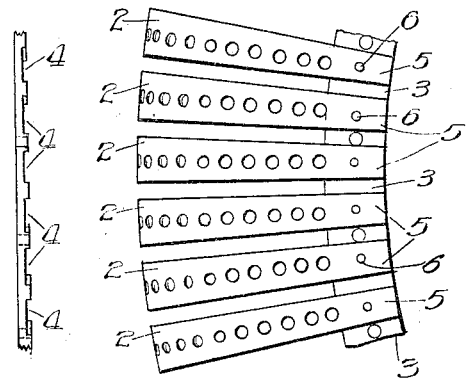
Fig.6
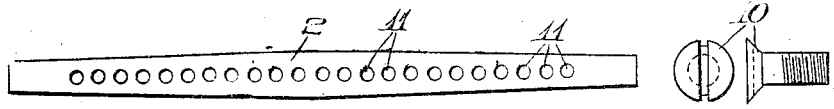
Fig.7
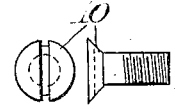
Fig.8
Witnesses
Charles J. Cobb
L. M. Baldwin
Inventor
Ellis W. Mighell
By Hill & Hill
Attorney

UNITED STATES PATENT OFFICE.

ELLIS W. MIGHELL, OF PLANO, ILLINOIS.

VEHICLE-TIRE.

1,234,682.                    Specification of Letters Patent.    Patented July 24, 1917.

Application filed March 11, 1916. Serial No. 83,553.

*To all whom it may concern:*

Be it known that I, ELLIS W. MIGHELL, a citizen of the United States, residing at Plano, in the county of Kendall and State of Illinois, have invented certain new and useful Improvements in Vehicle-Tires, of which the following is a description.

My invention belongs to that general class of vehicle tires composed of rubber or other suitable material, and providing a degree of resiliency in use, reducing the unavoidable shock present with solid tires. The object of my invention is to produce a simple and effective tire of the class described at a minimum cost, and which shall possess great durability.

To this end my invention consists in the novel construction, arrangement and combination of parts herein shown and described, and more particularly pointed out in the claims.

In the drawings, wherein like reference characters indicate like or corresponding parts, Figure 1 is a side elevation and part longitudinal section of a tire constructed in accordance with the present invention.

Fig. 2 is an edge view of the completed tire;

Fig. 3 is a diametrical section through the entire tire;

Fig. 4 is a transverse section of the tire and rim.

Figs. 5, 6, 7 and 8 are detail views.

In the drawings, 1 represents the casing which is provided with a plurality of transverse resilient members 2, which are secured to the casing 1, and serve to support the tire in operative position and form. 3—3 are circular locking rings provided with recesses 4 for the reception of the free ends 5 of the transverse resilient members 2, as clearly shown in Fig. 6. In the preferred construction these recesses are preferably slightly dove-tailed or tapered, with the parts 5 snugly but loosely positioned therein. Obviously, however, if preferred, the parts 5 may be secured to the part 3 by suitable rivets or bolts 6, as indicated in Fig. 4. 7 is the coöperating rim of a wheel for the reception of the tire, provided with outwardly extending wings or flanges 8, one flange 8 being shown as integral and the other flange as a separate part secured in place by bolts $8^2$ as illustrated in Fig. 4 of the drawing. When the tire is properly completed the rings 3 snugly fit within the outwardly extending wings 8 and bolts 10 secure the several parts comprising the tire, firmly to the rim of the wheel, as indicated.

While the transverse resilient members 2 may be secured to the casing in various ways, in the preferred construction, said members, which are preferably constructed of spring metal, are provided with a plurality of apertures 11. These members are positioned in a mold in proximity to one another, but preferably slightly separated, and the casing portion is finished thereabout. A part of the material will flow through the openings 11, and expanding on the interior thereof will form buttons connecting said members to the casing portion of the tire.

It will be seen that the rubber portion of the tire is sustained in normal operative form by means of the transverse spring metal sections 2, said sections being firmly united to the rubber portion by means of that part of the rubber which may extend between the several sections, and which may extend through the apertures 11.

Having thus described my invention, it is obvious that various immaterial modifications may be made in the same without departing from the spirit of my invention; hence I do not wish to be understood as limiting myself to the exact form, construction, arrangement and combination of parts herein shown and described, and uses mentioned.

What I claim as new and desire to secure by Letters Patent is:—

1. A tire comprising a casing provided with a plurality of transverse resilient members arranged interiorly of and connected with the casing, in combination with separate locking rings having recesses, the inner ends of the transverse resilient members fitting within the said recesses, and means for connecting the locking rings with the rim of the wheel.

2. The combination with a wheel-rim provided with outwardly extending side flanges, of a tire comprising a casing, a plurality of resilient members arranged transversely within the casing and fastened thereto; locking rings provided with recesses, the inner ends of the transverse resilient members fitting snugly within the said recesses, and means for securing said locking rings against the inner side faces of the outwardly extending side flanges of the wheel-rim.

3. A tire comprising a casing, a plurality of resilient members arranged transversely within the casing, said members having a plurality of apertures, the casing and resilient members being interlocked by portions of the casing passing through the apertures and locking on the inner sides of the members, in combination with locking rings, means connecting the free ends of the resilient members to the locking rings, and means to connect the locking rings to the rim of a wheel.

In testimony whereof, I have hereunto signed my name in the presence of two subscribing witnesses.

ELLIS W. MIGHELL.

Witnesses:
HARRIET E. MIGHELL,
HELEN SCHRYVER.